United States Patent
Hsiao et al.

(10) Patent No.: US 9,454,026 B2
(45) Date of Patent: Sep. 27, 2016

(54) LIQUID CRYSTAL MODULE AND LIQUID CRYSTAL DISPLAY

(71) Applicant: Shenzhen China Star Optoelectronics Technology Co., Ltd., Shenzhen, Guangdong (CN)

(72) Inventors: Yuchun Hsiao, Shenzhen (CN); Chong Huang, Shenzhen (CN); Weifeng Chen, Shenzhen (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 842 days.

(21) Appl. No.: 13/817,728

(22) PCT Filed: Jan. 10, 2013

(86) PCT No.: PCT/CN2013/070332
§ 371 (c)(1),
(2) Date: Feb. 19, 2013

(87) PCT Pub. No.: WO2014/107868
PCT Pub. Date: Jul. 17, 2014

(65) Prior Publication Data
US 2014/0226103 A1    Aug. 14, 2014

(51) Int. Cl.
*G02F 1/1333* (2006.01)

(52) U.S. Cl.
CPC ............ *G02F 1/133308* (2013.01); *G02F 2001/13332* (2013.01); *G02F 2001/133325* (2013.01)

(58) Field of Classification Search
CPC ............ G02F 1/133308; G02F 1/133615; G02F 1/133608; G02F 1/1333; G02F 1/1335; G02F 1/133524; G02F 2001/133317; G02F 2001/133314; G02F 2001/13332; G02F 2001/133322; G02F 2001/133325; G02F 2001/133331; G02F 2201/46; G02F 2201/465; G02F 2201/503; G02F 2201/50; G09F 13/0413; G09F 9/302; G09F 9/35
USPC ............ 349/58, 65; 361/752, 807, 809; 362/97.1, 634, 632, 97.2, 633, 362, 362/382, 433
See application file for complete search history.

(56) References Cited

U.S. PATENT DOCUMENTS 6,975,368 B2 * 12/2005 Lee .................. G02F 1/133308
349/58
2002/0054249 A1 * 5/2002 Ryu .................. G02F 1/133308
349/58

* cited by examiner

*Primary Examiner* — Thoi Duong
(74) *Attorney, Agent, or Firm* — Andrew C. Cheng

(57) ABSTRACT

A liquid crystal module is disclosed. The liquid crystal module includes a back plate having a vertical plate, a plastic frame arranged on the vertical plate for supporting the liquid crystal glass, a connecting assembly and a front frame. The connecting assembly is arranged above the plastic frame. An engaging location of the connecting assembly and the plastic frame is adjustable. A lateral side of the connecting assembly abuts against an edge of the liquid crystal glass. The front frame arranged above the connecting assembly is fixed with the connecting assembly. The front frame covers a rim of the liquid crystal glass. The relative location of the front frame and the liquid crystal glass can be easily adjusted via the connecting assembly. In addition, the displacement of the display area resulting from assembly errors is avoided. As such, the display area and the exposed black matrix remain consistent.

17 Claims, 4 Drawing Sheets

LIQUID CRYSTAL MODULE AND LIQUID CRYSTAL DISPLAY

BACKGROUND OF THE INVENTION

This application claims priority to China Patent Application No. 201310006909.3 filed on Jan. 9, 2013 entitled, LIQUID CRYSTAL MODULE AND LIQUID CRYSTAL DISPLAY, all of the disclosures of which are incorporated herein by reference in their entirety.

1. Field of the Invention

Embodiments of the present disclosure relate to Thin Film Transistor Liquid Crystal Display (TFT-LCD) technology, and more particularly to a liquid crystal module and the liquid crystal display with the same.

2. Discussion of the Related Art

FIG. 1 is a schematic view of a conventional liquid crystal module. The liquid crystal module includes a bottom plate 1, a backlight source 2 arranged on the bottom plate 1, a plastic frame 4 arranged on the bottom plate 1, and a liquid crystal glass 3 and a front frame 9 arranged on the plastic frame 4. After assembling the liquid crystal glass 3 with the plastic frame 4, the front frame 9 is then assembled by the bolt so as to complete the assembly of the liquid crystal module.

However, there are assembly errors when assembling the liquid crystal glass and the backlight source. For example, when the front frame is assembled, a width of the black matrix (BM) may not be consistent due to the displacement of the liquid crystal panel. As such, the display effect is affected. In addition, the assembly errors may also happen while the front frame is assembled with the plastic frame and the back plate. Therefore, the black matrix may be inconsistent and the display areas of the liquid crystal device are affected.

SUMMARY

The object of the claimed invention is to provide a liquid crystal module and the liquid crystal display with the same. With the liquid crystal module, the relative locations of the front frame and the liquid crystal glass are adjustable so that the display area is not affected.

In one aspect, A liquid crystal module includes: a back plate having a vertical plate; a plastic frame arranged on the vertical plate for supporting the liquid crystal glass; a connecting assembly arranged above the plastic frame, an engaging location of the connecting assembly and the plastic frame is adjustable, and a lateral side of the connecting assembly abuts against an edge of the liquid crystal glass; a front frame arranged above the connecting assembly, the front frame is fixed with the connecting assembly and covers a rim of the liquid crystal glass; and wherein the connecting assembly further comprises: a substantial sheet-shaped body comprises a through hole for fixing with the front frame; step surfaces formed by bending two ends of the body downward and then extending the two ends outward, and the step surfaces are substantially parallel to the body; a positioning pillar for the front frame is arranged on the body and extends out an up surface of the body; and wherein the step surfaces include U-shaped holes for passing a bolt through the plastic frame such that the bolt engages with one blind hole on an edge portion of the vertical plate of the back plate, and the engaging locations of the connecting assembly and the vertical plate of the back plate is adjustable by changing the engaging location of the U-shaped holes and the bolt.

Wherein the front frame further comprises: a positioning hole for being passed through by the positioning pillar of the connecting assembly so that the front frame is positioned on the connecting assembly; and a screw hole for engaging with the through holes of the connecting assembly, and the front frame and the connecting assembly are fixed together by passing the bolt through the screw hole of the front frame and the through hole of the connecting assembly.

Wherein the bolt passing through the U-shaped hole on the step surfaces of the connecting assembly further passes through the plastic frame so as to fix the connecting assembly and the plastic frame with the vertical plate of the back plate.

Wherein a buffering component is arranged at a lateral side of the body so that the connecting assembly abuts against an edge of the liquid crystal glass via the buffering component.

Wherein a black matrix covers the rim of the liquid crystal glass.

In another aspect, a liquid crystal module includes: a back plate having a vertical plate; a plastic frame arranged on the vertical plate for supporting the liquid crystal glass; a connecting assembly arranged above the plastic frame, an engaging location of the connecting assembly and the plastic frame is adjustable, and a lateral side of the connecting assembly abuts against an edge of the liquid crystal glass; and a front frame arranged above the connecting assembly, the front frame is fixed with the connecting assembly and covers a rim of the liquid crystal glass.

Wherein the connecting assembly further comprises: a substantial sheet-shaped body comprises a through hole for fixing with the front frame; step surfaces formed by bending two ends of the body downward and then extending the two ends outward, and the step surfaces are substantially parallel to the body; a positioning pillar for the front frame is arranged on the body and extends out an up surface of the body; and wherein the step surfaces include U-shaped holes for passing bolt through the plastic frame such that the bolt engages with one blind hole on an edge portion of the vertical plate of the back plate, and the engaging locations of the connecting assembly and the vertical plate of the back plate is adjustable by changing the engaging location of the U-shaped holes and the bolt.

Wherein the front frame further comprises: a positioning hole for being passed through by the positioning pillar of the connecting assembly so that the front frame is positioned on the connecting assembly; and a screw hole for engaging with the through holes of the connecting assembly, and the front frame and the connecting assembly are fixed together by passing the bolt through the screw hole of the front frame and the through hole of the connecting assembly.

Wherein a buffering component is arranged at a lateral side of the body so that the connecting assembly abuts against an edge of the liquid crystal glass via the buffering component.

Wherein the bolt passing through the U-shaped hole on the step surfaces of the connecting assembly further passes through the plastic frame so as to fix the connecting assembly and the plastic frame with the vertical plate of the back plate.

Wherein a black matrix covers the rim of the liquid crystal glass.

In another aspect, a liquid crystal display comprises a liquid crystal module, the liquid crystal module includes: a back plate having a vertical plate; a plastic frame arranged on the vertical plate for supporting the liquid crystal glass; a connecting assembly arranged above the plastic frame, an engaging location of the connecting assembly and the plastic frame is adjustable, and a lateral side of the connecting assembly abuts against an edge of the liquid crystal glass; and a front frame arranged above the connecting assembly, the front frame is fixed with the connecting assembly and covers a rim of the liquid crystal glass.

Wherein the connecting assembly further comprises: a substantial sheet-shaped body comprises a through hole for fixing with the front frame; step surfaces formed by bending two ends of the body downward and then extending the two ends outward, and the step surfaces are substantially parallel to the body; a positioning pillar for the front frame is arranged on the body and extends out an up surface of the body; and wherein the step surfaces include U-shaped holes for passing a bolt through the plastic frame such that the bolt engages with one blind hole on an edge portion of the vertical plate of the back plate, and the engaging locations of the connecting assembly and the vertical plate of the back plate is adjustable by changing the engaging location of the U-shaped holes and the bolt.

Wherein the front frame further comprises: a positioning hole for being passed through by the positioning pillar of the connecting assembly so that the front frame is positioned on the connecting assembly; and a screw hole for engaging with the through holes of the connecting assembly, and the front frame and the connecting assembly are fixed together by passing the bolt through the screw hole of the front frame and the through hole of the connecting assembly.

Wherein a buffering component is arranged at a lateral side of the body so that the connecting assembly abuts against an edge of the liquid crystal glass via the buffering component.

Wherein the bolt passing through the U-shaped hole on the step surfaces of the connecting assembly further passes through the plastic frame so as to fix the connecting assembly and the plastic frame with the vertical plate of the back plate.

Wherein a black matrix covers the rim of the liquid crystal glass.

DETAILED DESCRIPTION OF THE EMBODIMENTS

Embodiments of the invention will now be described more fully hereinafter with reference to the accompanying drawings, in which embodiments of the invention are shown.

Figure 1:
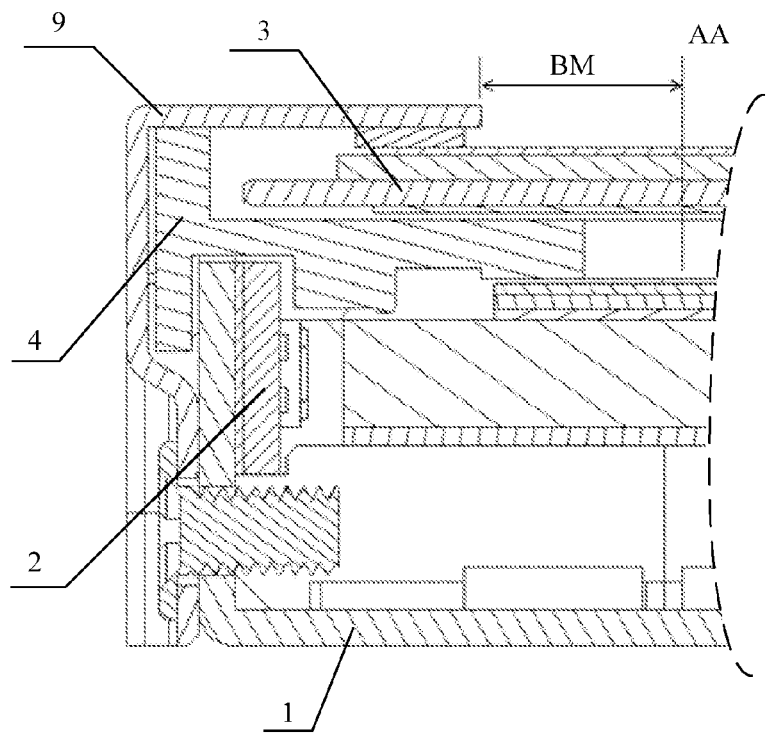
FIG. 1 is a schematic view of a conventional liquid crystal module.
Figure 2:
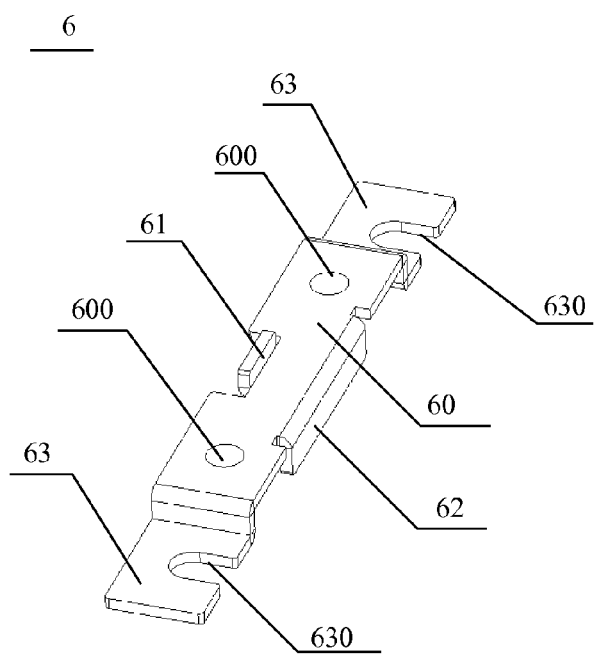
FIG. 2 is a schematic view of a connecting assembly in accordance with one embodiment.
Figure 3:
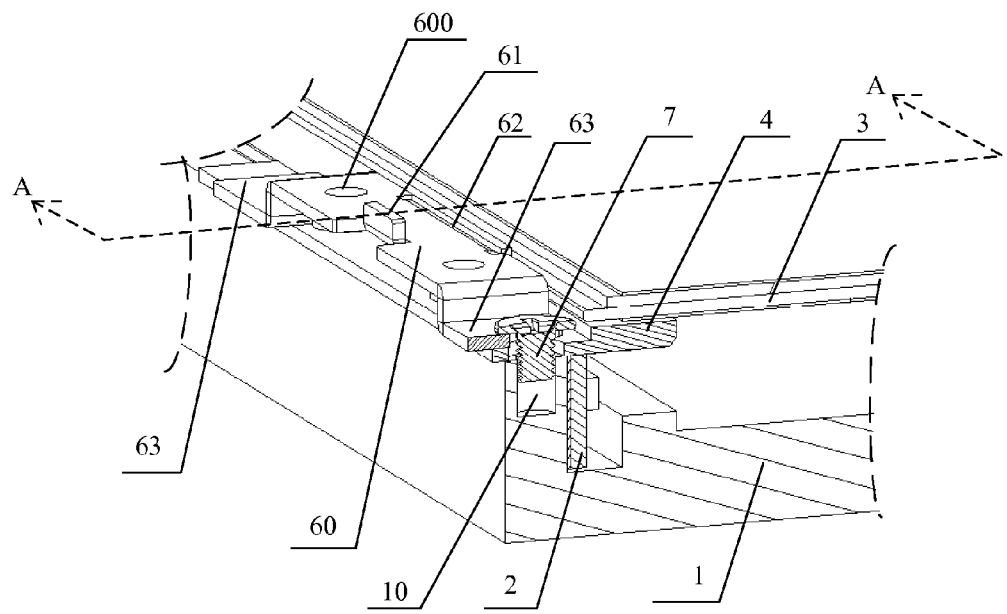
FIG. 3 is a partial schematic view of the liquid crystal module before the front frame is assembled.
Figure 4:
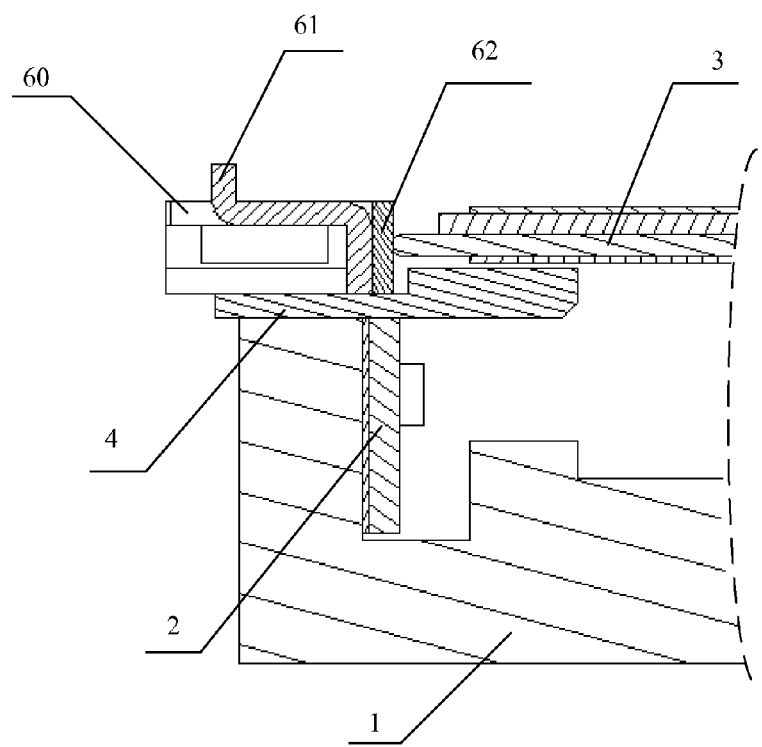
FIG. 4 is a cross section view of the FIG. 3 along the A-A line.
Figure 5:
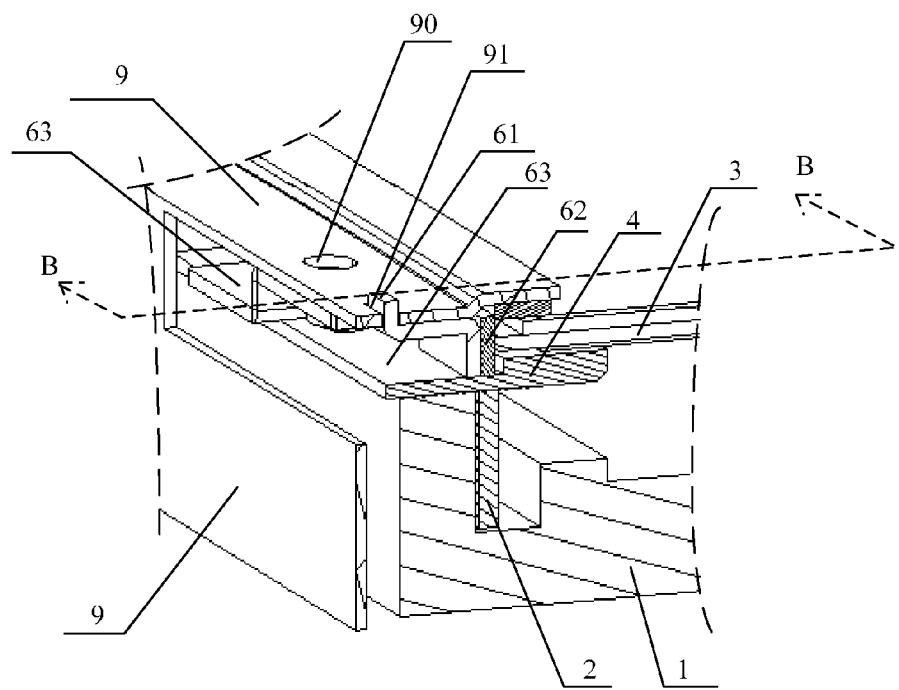
FIG. 5 is a partial schematic view of the liquid crystal module after the front frame is assembled.
Figure 6:
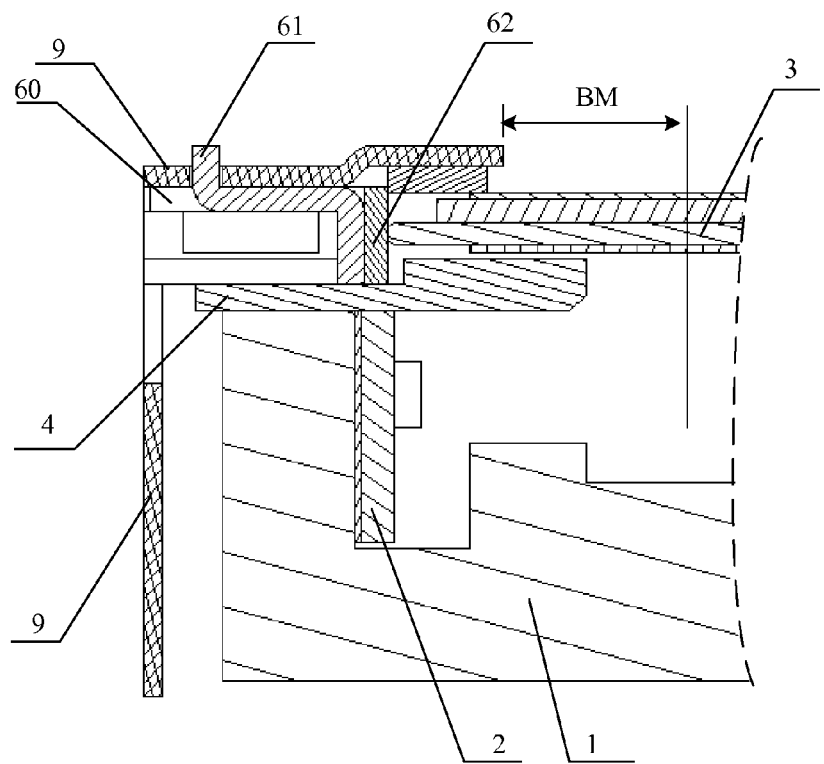
FIG. 6 is a cross section view of the FIG. 5 along the B-B line.
Figure 7:
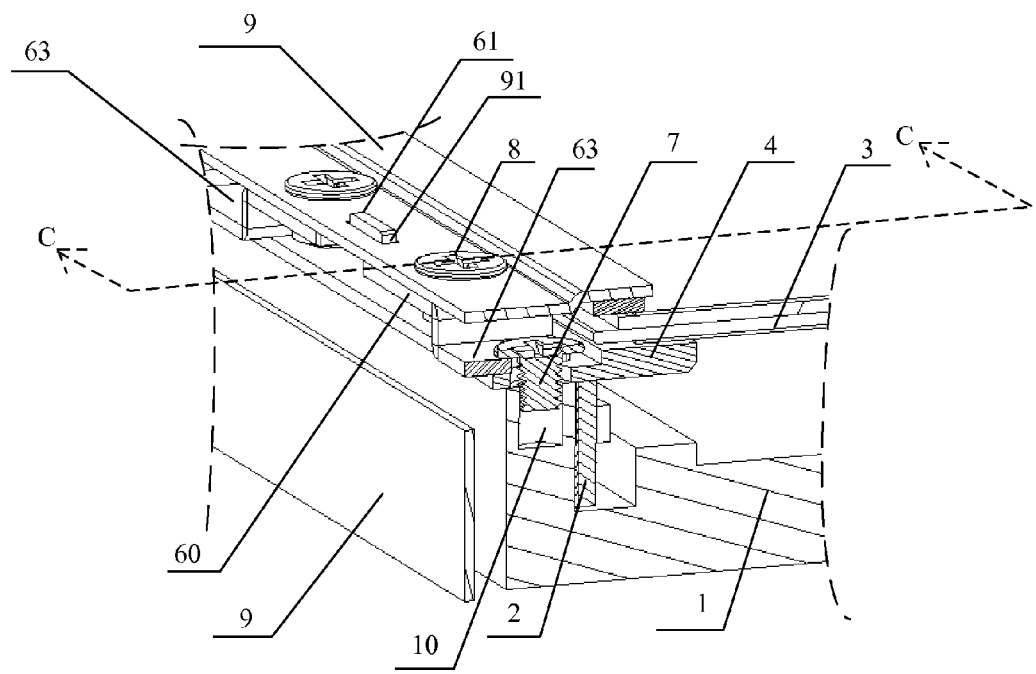
FIG. 7 is a partial schematic view of the liquid crystal module after the front frame is assembled.
Figure 8:
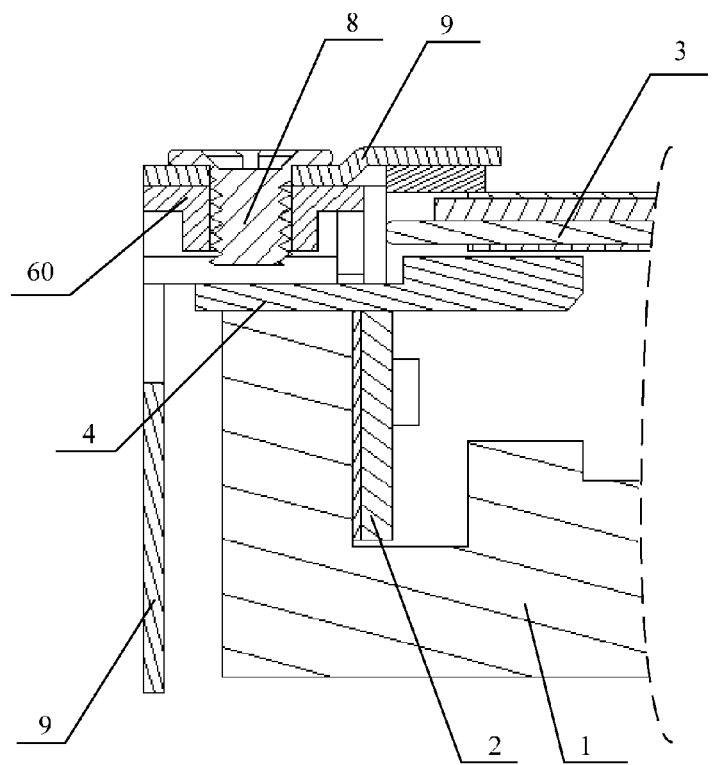
FIG. 8 is a cross section view of the FIG. 7 along the C-C line.

FIG. 2 is a schematic view of a connecting assembly in accordance with one embodiment. The connecting assembly 6 includes a body 60, step surfaces 63, a positioning pillar 61 for a front frame, and a buffering component 62 arranged at a lateral side of the body 60.

The body 60 is substantially sheet-shaped. The body 60 may be a metallic sheet, or may be made by die casting or extrusion.

Two ends of the body 60 are bent downward and are extended outward so as to form the two step surfaces 63. The step surfaces 63 are substantially parallel to the body 60.

The positioning pillar 61 arranged on the body 60 extrudes out an up surface of the body 60. The step surfaces 63 include U-shaped holes 630.

The body 60 includes a through hole 600.

FIGS. 3-8 are schematic views of the connecting assembly 6 in accordance with one embodiment. The liquid crystal module includes a back plate 1 having at least a vertical plate, a backlight source 2 arranged at an internal side of the vertical plate, a liquid crystal glass 3, a plastic frame 4, the connecting assembly 6, a bolt 7, and the front frame 9.

The plastic frame 4 is arranged on a top of the vertical plate of the back plate 1 for supporting the liquid crystal glass 3. A rim of the liquid crystal glass 3 is covered by the black matrix.

The connecting assembly 6 is arranged above the plastic frame 4. The buffering component 62 of the connecting assembly 6 abuts against an edge of the liquid crystal glass 3 so as to protect the liquid crystal glass 3. In addition, the connecting assembly 6 is assembled with the plastic frame 4 by passing the bolt 7 through the U-shaped hole 630. It is to be understood that corresponding screw holes are arranged on the plastic frame 4. As the length of the U-shaped hole 630 is defined, the engaging location of the U-shaped hole 630 and the bolt 7 may be adjusted by changing the location of the bolt 7 within the U-shaped hole 630. As such, the relative locations between the connecting assembly 6, the plastic frame 4, and the vertical plate of the back plate 1 are adjustable. Furthermore, the relative location between the connecting assembly 6 and the liquid crystal glass 3 is adjustable. In one embodiment, the bolt 7 not only passes through the U-shaped hole 630, but also passes through the plastic frame 4 so as to engage with one blind hole 10 on an edge portion of the vertical plate of the back plate 1.

The front frame 9 arranged above the connecting assembly 6 is fixed with the connecting assembly 6. The front frame 9 covers the rim of the liquid crystal glass 3. Specifically, the front frame 9 includes a positioning hole 91 and a screw hole 90. The positioning hole 91 is for being passed through by the positioning pillar 61 of the connecting assembly 6 so that the front frame 9 is positioned on the connecting assembly 6. The screw hole 90 engages with the through holes 600 of the connecting assembly 6. The front frame 9 and the connecting assembly 6 are fixed together by passing the bolt 8 through the screw hole 90 of the front frame 9 and through the through hole 600 of the connecting assembly 6.

In view of the above, the connecting assembly 6 is arranged between the liquid crystal glass 3 and the front frame 9. The connecting assembly 6 adjusts the location of the bolt 7 within the through hole 600 so as to adjust the engaging location of the liquid crystal glass 3 and the plastic frame 4. The connecting assembly 6 and the front frame 9 are positioned by the positioning pillar 61 and are fixed by the bolt 8. That is to say the relative location of the front frame 9 and the connecting assembly 6 is fixed, and that of the connecting assembly 6 and the liquid crystal glass 3 is adjustable. In this way, the relative location of the front frame 9 and the liquid crystal glass 3 is adjustable so that the displacement of the display area of the liquid crystal panel is avoided. In other words, the display area and the exposed black matrix shown in FIG. 6 remain consistent.

In other embodiments, a liquid crystal display includes the above liquid crystal module in FIGS. 2 to 8.

The connecting assembly is arranged between the liquid crystal panel and the front frame so that the relative location of the front frame and the liquid crystal panel is adjustable. In addition, the displacement of the display resulting from the assembly errors is avoided. In this way, the display area and the black matrix of the liquid crystal module remain consistent.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal module, comprising:
    a back plate having a vertical plate;
    a plastic frame arranged on the vertical plate for supporting a liquid crystal glass;
    a connecting assembly arranged above the plastic frame, an engaging location of the connecting assembly and the plastic frame is adjustable, and a lateral side of the connecting assembly abuts against an edge of the liquid crystal glass; and
    a front frame arranged above the connecting assembly, the front frame is fixed with the connecting assembly and covers a rim of the liquid crystal glass;
    wherein the connecting assembly further comprises:
    a substantial sheet-shaped body comprises a through hole for fixing with the front frame;
    step surfaces formed by bending two ends of the body downward and then extending the two ends outward, and the step surfaces are substantially parallel to the body;
    a positioning pillar for the front frame is arranged on the body and extends out an up surface of the body; and
    wherein the step surfaces include U-shaped holes for passing a bolt through the plastic frame such that the bolt engages with one blind hole on an edge portion of the vertical plate of the back plate, and the engaging location of the connecting assembly and the vertical plate of the back plate is adjustable by changing the engaging location of the U-shaped holes and the bolt.

2. The liquid crystal module as claimed in claim 1, wherein the front frame further comprises:
    a positioning hole for being passed through by the positioning pillar of the connecting assembly so that the front frame is positioned on the connecting assembly; and
    a screw hole for engaging with the through holes of the connecting assembly, and the front frame and the connecting assembly are fixed together by passing the bolt through the screw hole of the front frame and the through hole of the connecting assembly.

3. The liquid crystal module as claimed in claim 2, wherein the bolt passing through the U-shaped hole on the step surfaces of the connecting assembly further passes through the plastic frame so as to fix the connecting assembly and the plastic frame with the vertical plate of the back plate.

4. The liquid crystal module as claimed in claim 3, wherein a buffering component is arranged at a lateral side of the body so that the connecting assembly abuts against an edge of the liquid crystal glass via the buffering component.

5. The liquid crystal module as claimed in claim 4, wherein a black matrix covers the rim of the liquid crystal glass.

6. A liquid crystal module, comprising:
    a back plate having a vertical plate;
    a plastic frame arranged on the vertical plate for supporting a liquid crystal glass;
    a connecting assembly arranged above the plastic frame, an engaging location of the connecting assembly and the plastic frame is adjustable, and a lateral side of the connecting assembly abuts against an edge of the liquid crystal glass; and
    a front frame arranged above the connecting assembly, the front frame is fixed with the connecting assembly and covers a rim of the liquid crystal glass.

7. The liquid crystal module as claimed in claim 6, wherein the connecting assembly further comprises:
    a substantial sheet-shaped body comprises a through hole for fixing with the front frame;
    step surfaces formed by bending two ends of the body downward and then extending the two ends outward, and the step surfaces are substantially parallel to the body;
    a positioning pillar for the front frame is arranged on the body and extends out an up surface of the body; and
    wherein the step surfaces include U-shaped holes for passing a bolt through the plastic frame such that the bolt engages with one blind hole on an edge portion of the vertical plate of the back plate, and the engaging location of the connecting assembly and the vertical plate of the back plate is adjustable by changing the engaging location of the U-shaped holes and the bolt.

8. The liquid crystal module as claimed in claim 7, wherein the front frame further comprises:
    a positioning hole for being passed through by the positioning pillar of the connecting assembly so that the front frame is positioned on the connecting assembly; and
    a screw hole for engaging with the through holes of the connecting assembly, and the front frame and the connecting assembly are fixed together by passing the bolt through the screw hole of the front frame and the through hole of the connecting assembly.

9. The liquid crystal module as claimed in claim 8, wherein a buffering component is arranged at a lateral side of the body so that the connecting assembly abuts against an edge of the liquid crystal glass via the buffering component.

10. The liquid crystal module as claimed in claim 9, wherein the bolt passing through the U-shaped hole on the step surfaces of the connecting assembly further passes through the plastic frame so as to fix the connecting assembly and the plastic frame with the vertical plate of the back plate.

11. The liquid crystal module as claimed in claim 10, wherein a black matrix covers the rim of the liquid crystal glass.

12. A liquid crystal display comprises a liquid crystal module, the liquid crystal module comprising:
    a back plate having a vertical plate;
    a plastic frame arranged on the vertical plate for supporting a liquid crystal glass;
    a connecting assembly arranged above the plastic frame, an engaging location of the connecting assembly and the plastic frame is adjustable, and a lateral side of the connecting assembly abuts against an edge of the liquid crystal glass; and a front frame arranged above the connecting assembly, the front frame is fixed with the connecting assembly and covers a rim of the liquid crystal glass.

13. The liquid crystal display as claimed in claim 12, wherein the connecting assembly further comprises:

a substantial sheet-shaped body comprises a through hole for fixing with the front frame;

step surfaces formed by bending two ends of the body downward and then extending the two ends outward, and the step surfaces are substantially parallel to the body;

a positioning pillar for the front frame is arranged on the body and extends out an up surface of the body; and wherein the step surfaces include U-shaped holes for passing a bolt through the plastic frame such that the bolt engages with one blind hole on an edge portion of the vertical plate of the back plate, and the engaging location of the connecting assembly and the vertical plate of the back plate is adjustable by changing the engaging location of the U-shaped holes and the bolt.

14. The liquid crystal display as claimed in claim 13, wherein the front frame further comprises:

a positioning hole for being passed through by the positioning pillar of the connecting assembly so that the front frame is positioned on the connecting assembly; and a screw hole for engaging with the through holes of the connecting assembly, and the front frame and the connecting assembly are fixed together by passing the bolt through the screw hole of the front frame and the through hole of the connecting assembly.

15. The liquid crystal display as claimed in claim 14, wherein a buffering component is arranged at a lateral side of the body so that the connecting assembly abuts against an edge of the liquid crystal glass via the buffering component.

16. The liquid crystal display as claimed in claim 15, wherein the bolt passing through the U-shaped hole on the step surfaces of the connecting assembly further passes through the plastic frame so as to fix the connecting assembly and the plastic frame with the vertical plate of the back plate.

17. The liquid crystal display as claimed in claim 16, wherein a black matrix covers the rim of the liquid crystal glass.

* * * * *